No. 804,947. PATENTED NOV. 21, 1905.
C. H. HAPGOOD.
COMBINED SPRING AND LEVER SCALE.
APPLICATION FILED APR. 8, 1903.

3 SHEETS—SHEET 1.

WITNESSES:
Matthew Seibler
C. M. Theobald.

INVENTOR
C. H. Hapgood
BY R. J. McCarty
ATTORNEY

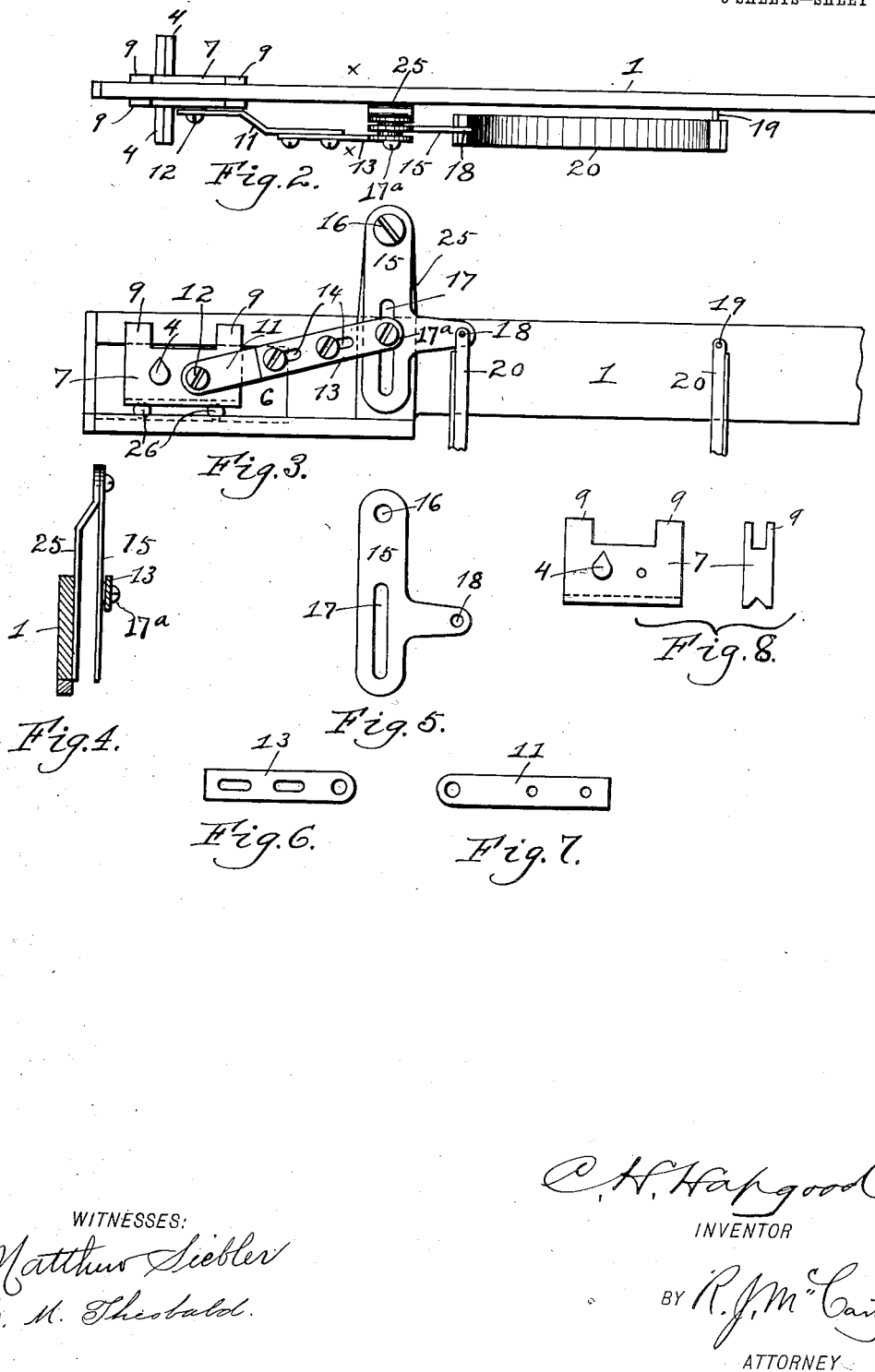

No. 804,947. PATENTED NOV. 21, 1905.
C. H. HAPGOOD.
COMBINED SPRING AND LEVER SCALE.
APPLICATION FILED APR. 8, 1903.

3 SHEETS—SHEET 3.

WITNESSES:
Matthew Siebler
D. E. Beegely

C. H. Hapgood.
INVENTOR
BY R. J. McCarty
his ATTORNEY

UNITED STATES PATENT OFFICE.

CLARENCE H. HAPGOOD, OF DAYTON, OHIO, ASSIGNOR TO THE COMPUTING SCALE COMPANY, OF DAYTON, OHIO, A CORPORATION OF OHIO.

COMBINED SPRING AND LEVER SCALE.

No. 804,947. Specification of Letters Patent. Patented Nov. 21, 1905.

Application filed April 8, 1903. Serial No. 151,579.

*To all whom it may concern:*

Be it known that I, CLARENCE H. HAPGOOD, a citizen of the United States, residing at Dayton, in the county of Montgomery and State of Ohio, have invented certain new and useful Improvements in a Combined Spring and Lever Scale; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in combination spring and lever scales.

The object of the invention is to provide means by which the changes in the tension of the spring or springs of the scale due to the variations in the temperature of the surrounding atmosphere are compensated for by a corresponding change in the leverage of the weighing-lever through the action of a thermostat.

Preceding a detail description of the invention reference is made to the accompanying drawings, of which—

Figure 1:
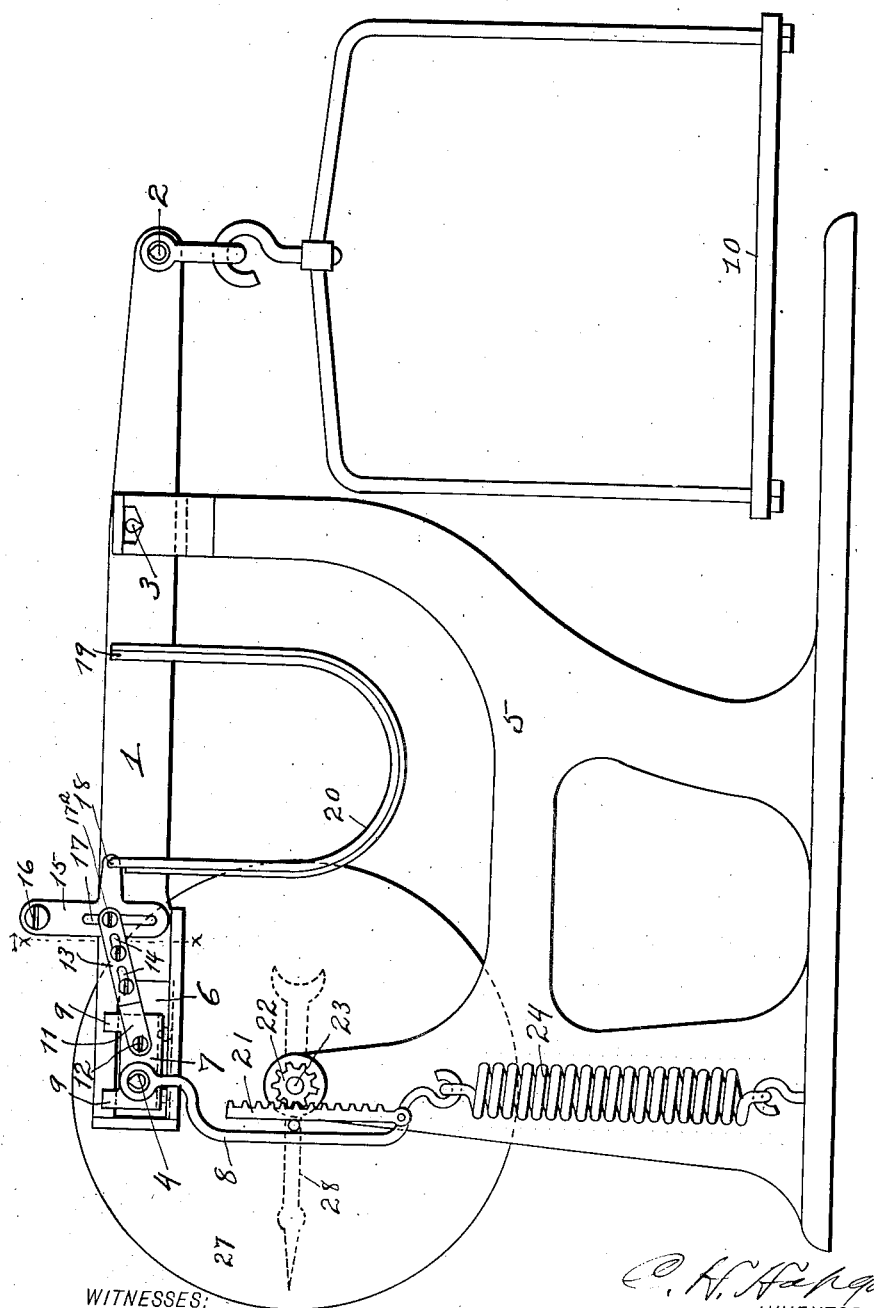
Figure 9:
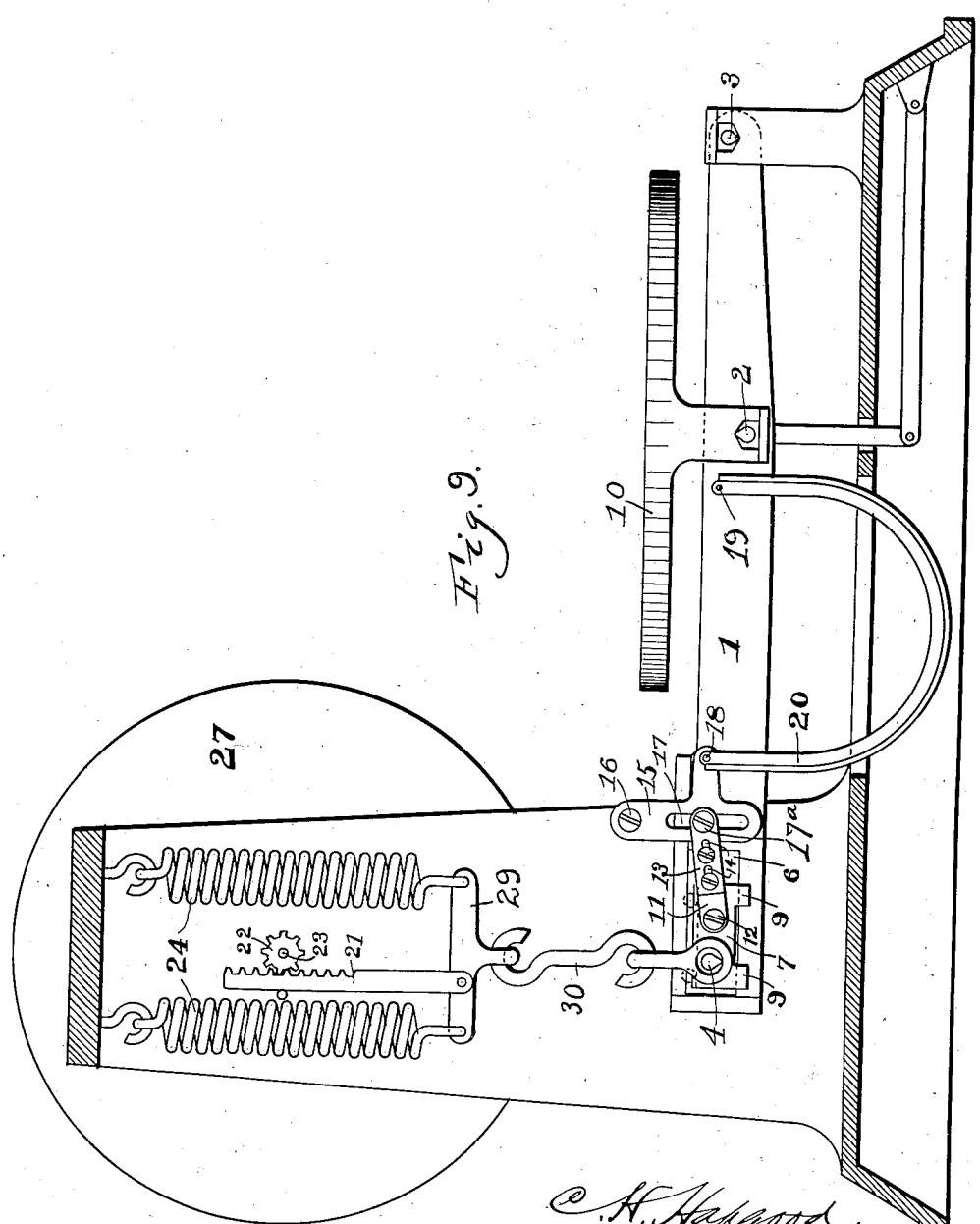

Figure 1 is a side elevation of a combined spring and lever scale having my improvements applied. Fig. 2 is an enlarged top view of a portion of the weighing-lever with the thermostatic mechanism applied. Fig. 3 is a side elevation of the mechanism shown in Fig. 2. Fig. 4 is a sectional view on the line *x x* of Fig. 1. Fig. 5 is a detached view of the multiplying-lever. Figs. 6 and 7 are detached views of the levers which connect the multiplying-lever with the pivot-carrier. Fig. 8 is a side and end elevation of the pivot-carrier. Fig. 9 is a partial sectional side elevation of a scale, showing the use of two springs which are attached above the weighing-lever.

In a detail description of the invention similar reference characters indicate corresponding parts.

My improvements are susceptible of being applied to any of the well-known classes of levers. Therefore I do not wish to limit myself to any one particular class of levers, and, further, it may be stated that it is immaterial whether the spring or springs be so mounted as to exert their influence upon the lever either at a point below said lever or above it.

Proceeding to the detailed description, 1 designates a weighing-lever, which is fulcrumed on frame 5 by means of knife-edge pivot 3 and has on one end thereof a knife-edge pivot 2, which supports a platform or a weighing-plate 10. The other end of said weighing-lever has a movable knife-edge pivot 4, which is rigidly mounted on a carrier 7, movable on antifriction-bearings 26 in a suitable opening 6 in the end of said lever, said carrier being operatively maintained in such position by guide-lugs 9, which project on each side of the lever. By means of this changeable pivot 4 the leverage of the weighing-lever is automatically changed to correspond with the changes in the tension of the springs under the variations in the atmospheric temperature. The knife-edge pivot 4 affords a bearing for a steelyard-coupling 8, which has attached to it one or more springs 24 and a rack 21, which engages a pinion 22 and operates the indicating mechanism consisting of the usual dial 27 and pointer 28, the latter being fixed to the arbor 23 of said pinion.

20 designates a thermostat, preferably of a horseshoe shape and constructed of metals of different expanding and contracting natures—for example, brass and steel. This thermostat device is attached at one end to the weighing-lever 1 by a pivot 19, and the opposite end of said thermostat is free to move under the contracting and expanding influences of the temperature of the surrouning atmosphere. The said free end of said thermostat is pivotally connected to a multiplying-lever 15. Therefore the energy transmitted to said thermostat from the variations in the atmospheric temperature will be likewise correspondingly transmitted to the multiplying-lever 15, according to the direction of the movement of said thermostat. The multiplying-lever 15 is fulcrumed at one end to a pivot 16 on an upright arm 25, which is rigidly supported on the weighing-lever 1.

The carrier 7, upon which the pivot 4 is rigidly mounted, is connected with said multiplying-lever 15, so that it may receive the movements transmitted to said multiplying-lever by the thermostat. The means for connecting said carrier consists of adjustable connecting-links 11 and 13, one of which is pivoted at 12 to said carrier and the other of which is pivoted to the multiplying-lever at 17ᵃ, said pivot passing through an oblong slot 17 in said multiplying-lever. The connections between the links 11 and 13 are adjustable by means of screws which pass through oblong slots 14 in said levers, so that the proper adjustment may be given the pivot-carrier 7 to enable the pivot 4 to occupy a position in a proper vertical alinement with the lower extremity of the spring or springs 24 without interfering with the thermostat or the multiplying-lever connected thereto. In this connection it may be stated that when the thermostat 20 and the multiplying-lever 15 are mounted upon and connected to the weighing-lever 1, as hereinbefore stated, the said multiplying-lever should be in a position approximately at a right angle to the weighing-lever. It is therefore obvious that the position of the said multiplying-lever should not be interfered with in any subsequent adjustment of the pivot 4 that might be found necessary to bring said pivot in a proper position relatively to the lower end of the spring or springs 24. It is possible to thus avoid interfering with the position of the thermostat and the multiplying-lever by means of the connecting-links 11 and 13, which, as hereinbefore stated, are adjustable lengthwise by means of the slots 14.

It will be seen that the distance between the pivots 16 and 18 is of a definite nature or is always the same regardless of the extent of the movement imparted to the thermostat and thence to the multiplying-lever 15; but the distance between the pivot 16 and the pivot 17ª is not of a permanent nature, but may be changed in order to increase or decrease the extent of the movement imparted to the pivot-carrier 7 from the thermostat through the multiplying-lever 15.

As shown in Fig. 3, the distance between the pivots 16 and 17ª is less than the distance between the pivots 16 and 18. It therefore follows that the movement transmitted to the pivot-carrier 7 will not be as great as the movement imparted to the multiplying-lever by the thermostat through a change in the temperature of the surrounding atmosphere. As an example, it may be stated that in a change of temperature—say in 50°—the thermostat will not impart to the pivot-carrier 7 sufficient movement to compensate for the variation in the tension of the spring or springs due to that degree of temperature. Therefore the distance from the pivot 16 to the pivot 17ª is made greater than that shown in Fig. 3 in order to properly change the leverage of the weighing-lever, and thereby compensate for the change in the tension of the springs, and thus enable the indicating mechanism to operate accurately. The pivot 17ª is made rigid to the multiplying-lever 15 after the proper distance between the pivot 16 and the pivot 17ª is determined; but the connection of lever 13 with said pivot 17ª is not of a rigid character. The pivots 16, 18, and 17ª are all sufficiently loose to permit of the movement of the parts with the least possible friction; but obviously there should be no lost motion permitted between the parts, for the reason that the movements of the thermostat and the intervening levers must be positively transmitted to the pivot-carrier 7.

As hereinbefore stated, my improvements are applicable to any of the various forms of combined spring and lever scales. In Fig. 9 the fulcrum-pivot 3, it will be observed, is on one end of the weighing-lever 1, and the load-pivot 2 is between the fulcrum-pivot and the movable power-pivot 4. The springs 24 have fixed points of attachment above the weighing-lever instead of below, as in Fig. 1, and are connected to the movable power-pivot 4 through cross-bar 29 and link 30.

Having described my invention, I claim—

1. In a combined spring and lever scale, a lever having pivots, one of which is movable lengthwise of said lever, a carrier upon which said movable pivot is mounted, a thermostat, a multiplying-lever to which said thermostat is connected, adjustable connections between said multiplying-lever and the carrier whereby a proper adjustment of the movable pivot relative to the lower extremity of the spring is obtained.

2. In a combined spring and lever scale, a lever having pivots one of which is movable lengthwise of the lever, a thermostat for moving said pivot and adjustable connections between the thermostat and pivot whereby the pivot may be set to correct initial position.

3. In a combined spring and lever scale, a weighing-lever having a longitudinally-movable pivot, thermostatic devices adapted to impart movement to said pivot to compensate for the effect of variations in temperature on the counterbalancing mechanism and means for manually adjusting said pivot to correct initial position.

4. In a combined spring and lever scale, a weighing-lever having a longitudinally-movable pivot, a lever, adjustable connections between said last-mentioned lever and longitudinally-movable pivot and a thermostat connected with said last-mentioned lever to impart movement to the pivot.

5. In a combined spring and lever scale, a weighing-lever having a longitudinally-movable pivot, a thermostat, a lever with which the thermostat is connected and a connection between said last-mentioned lever and pivot adjustable toward and from the axis of the lever whereby the effective throw of the lever in moving the pivot may be varied.

In testimony whereof I affix my signature in presence of two witnesses.

CLARENCE H. HAPGOOD.

Witnesses:
R. J. McCARTY,
JOHN W. KALBFUS.